United States Patent
Tur et al.

(10) Patent No.: US 9,213,558 B2
(45) Date of Patent: Dec. 15, 2015

(54) METHOD AND APPARATUS FOR TAILORING THE OUTPUT OF AN INTELLIGENT AUTOMATED ASSISTANT TO A USER

(75) Inventors: Gokhan Tur, Fremont, CA (US); Horacio E. Franco, Menlo Park, CA (US); Elizabeth Shriberg, Berkeley, CA (US); Gregory K. Myers, San Francisco, CA (US); William S. Mark, San Mateo, CA (US); Norman D. Winarsky, Palo Alto, CA (US); Andreas Stolcke, Berkeley, CA (US); Bart Peintner, Palo Alto, CA (US); Michael J. Wolverton, Mountain View, CA (US); Luciana Ferrer, Caba (AR); Martin Graciarena, Belmont, CA (US); Harry Bratt, Mountain View, CA (US); Neil Yorke-Smith, Mountain View, CA (US)

(73) Assignee: SRI INTERNATIONAL, Menlo Parka, CA (US)

( * ) Notice: Subject to any disclaimer, the term of this patent is extended or adjusted under 35 U.S.C. 154(b) by 393 days.

(21) Appl. No.: 13/378,512

(22) PCT Filed: Sep. 1, 2010

(86) PCT No.: PCT/US2010/047588
§ 371 (c)(1),
(2), (4) Date: Mar. 12, 2012

(87) PCT Pub. No.: WO2011/028844
PCT Pub. Date: Mar. 10, 2011

(65) Prior Publication Data
US 2012/0166365 A1 Jun. 28, 2012

Related U.S. Application Data

(60) Provisional application No. 61/275,781, filed on Sep. 2, 2009.

(51) Int. Cl.
*G06N 5/00* (2006.01)
*G06F 1/00* (2006.01)
*G06F 9/44* (2006.01)

(52) U.S. Cl.
CPC .................................. *G06F 9/4446* (2013.01)

(58) Field of Classification Search
USPC .......................................................... 706/11
See application file for complete search history.

(56) References Cited

U.S. PATENT DOCUMENTS

2001/0017632 A1  8/2001  Goren-Bar
2007/0099602 A1  5/2007  Kurlander et al.
(Continued)

FOREIGN PATENT DOCUMENTS

EP  1855186 A2  11/2007

OTHER PUBLICATIONS

International Search Report and Written Opinion for PCT/US2010/047588, May 2, 2011, consists of 9 unnumbered pages.
(Continued)

*Primary Examiner* — Jeffrey A Gaffin
*Assistant Examiner* — Kalpana Bharadwaj
(74) *Attorney, Agent, or Firm* — Barnes & Thornburg LLP; Thomas J. McWilliams; Edward F. Behm, Jr.

(57) ABSTRACT

The present invention relates to a method and apparatus for tailoring the output of an intelligent automated assistant. One embodiment of a method for conducting an interaction with a human user includes collecting data about the user using a multimodal set of sensors positioned in a vicinity of the user, making a set of inferences about the user in accordance with the data, and tailoring an output to be delivered to the user in accordance with the set of inferences.

18 Claims, 5 Drawing Sheets

(56) References Cited

U.S. PATENT DOCUMENTS

| | | |
|---|---|---|
| 2008/0262909 A1 | 10/2008 | Li et al. |
| 2009/0207457 A1* | 8/2009 | Lapstun et al. .............. 358/3.28 |
| 2010/0048242 A1* | 2/2010 | Rhoads et al. ............. 455/556.1 |
| 2010/0290668 A1* | 11/2010 | Friedman et al. ............. 382/103 |

OTHER PUBLICATIONS

International Preliminary Report on Patentability for PCT/US2010/047588, Mar. 15, 2012, consist of 6 unnumbered pages.

* cited by examiner

METHOD AND APPARATUS FOR TAILORING THE OUTPUT OF AN INTELLIGENT AUTOMATED ASSISTANT TO A USER

CROSS REFERENCE TO RELATED APPLICATIONS

This application claims the benefit of U.S. Provisional Patent Application Ser. No. 61/275,781, filed Sep. 2, 2009, which is herein incorporated by reference in its entirety.

FIELD OF THE INVENTION

The present invention relates generally to intelligent systems, and relates more particularly to techniques by which the behavior of an intelligent system may be tailored to a specific user.

BACKGROUND OF THE DISCLOSURE

Intelligent automated assistant systems that perform functions in response to user requests are common in many contexts. Such systems may be used, for example, in navigation systems and customer service applications.

Conventional intelligent automated assistant systems are somewhat generic with respect to users. That is, the preferences of a new user are typically not known to the system during the initial exchanges. Knowledge of and ability to adapt to these preferences makes for a more pleasant user experience.

SUMMARY OF THE INVENTION

The present invention relates to a method and apparatus for tailoring the output of an intelligent automated assistant. One embodiment of a method for conducting an interaction with a human user includes collecting data about the user using a multimodal set of sensors positioned in a vicinity of the user, making a set of inferences about the user in accordance with the data, and tailoring an output to be delivered to the user in accordance with the set of inferences.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for tailoring the output of an intelligent automated assistant to a user. Embodiments of the invention estimate a user's personal characteristics and/or current affective state (mood) so that the system's "personality" can be adjusted to be more pleasing to the user. This includes adjusting not just the manner in which the output is formulated and presented to the user, but also the timing of the output in some cases. The adjustments can be applied to all users, to a single user, or to specific classes of users.

Figure 1:
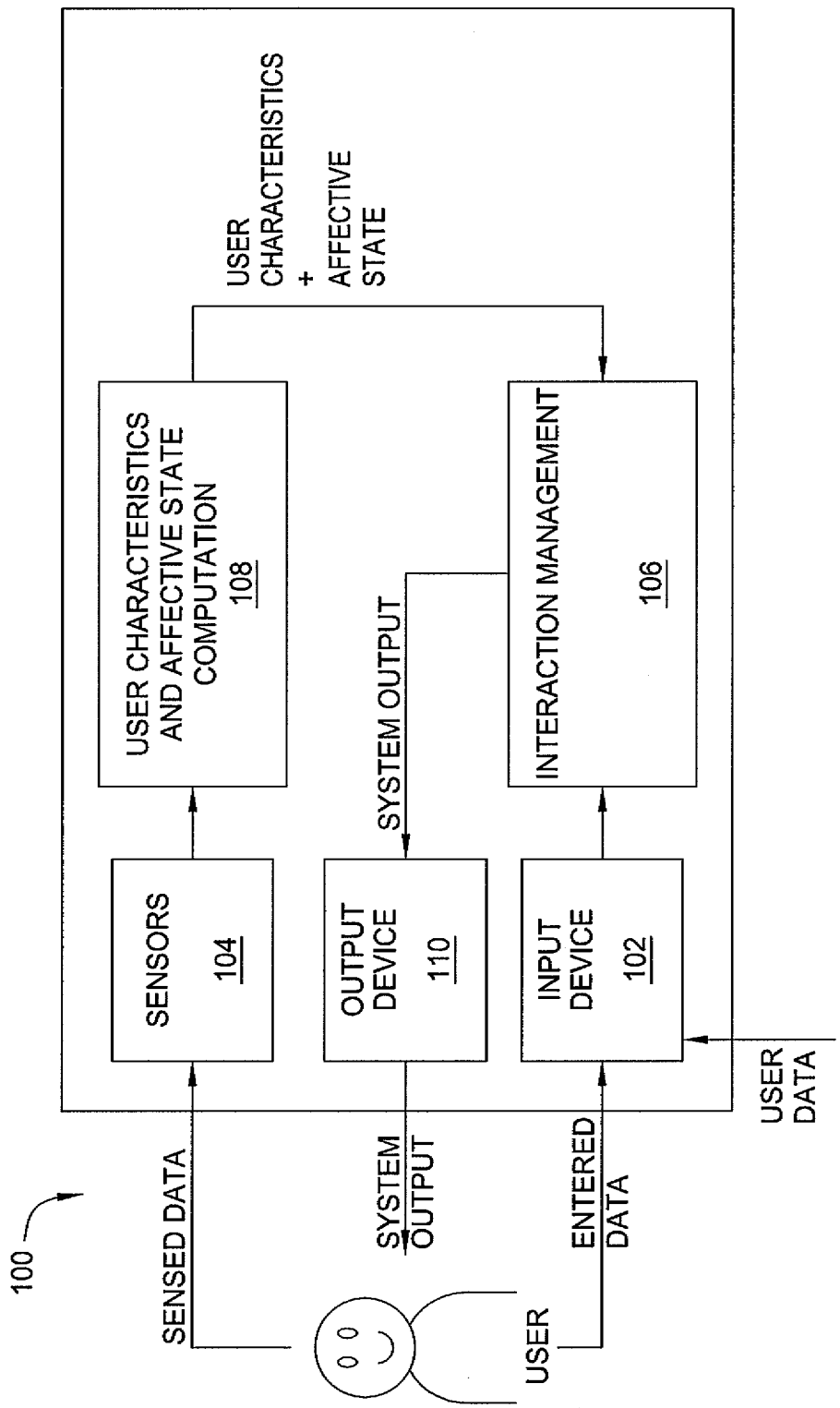
FIG. 1 is a schematic diagram illustrating one embodiment of an intelligent automated assistant system, according to the present invention.

FIG. 1 is a schematic diagram illustrating one embodiment of an intelligent automated assistant system 100, according to the present invention. The system 100 may be incorporated, for example, in a consumer computing device such as a desktop computer, a laptop computer, a cellular telephone, a smart phone, a personal digital assistant, a navigation device, a gaming device, a set top box, or the like. Alternatively, the system 100 may be incorporated in a commercial interactive dialogue system, such as dialogue systems that are used for customer service applications.

As illustrated, the system 100 generally comprises at least one input device 102, a plurality of sensors 104, an interaction management module 106, a user characteristics and affective state computation module 108, and an output device 110. In one embodiment, all of these components are contained within a single device. In an alternative embodiment, these components are distributed over two or more devices, which allows data to be input and output from locations that are remote from the locations at which further processing takes place.

The input device 102 receives system inputs from a system user. In one embodiment, the input device comprises one or more of the following: a keyboard, a stylus, a mouse, a microphone, a camera, or a network interface (which allows the system 100 to receive input from remote devices).

In one embodiment, the inputs received by the input device 102 are deliberately entered by the user. The inputs received from the user include primary data that is entered by the user, such as requests for assistance (e.g., requests for directions to a specific location, requests for information, or the like). In one embodiment, the inputs received from the user also include the user's feedback with respect to previous system outputs. In addition, the system inputs may include stored user data, such as a user profile.

The sensors 104 are positioned in the vicinity of the user and receive inputs regarding the user's personal characteristics and/or affective state (e.g., mood). In one embodiment, the sensors include one or more of the following: a microphone, a camera, a pressure sensor, or a temperature sensor.

In one embodiment, the inputs received by the sensors 104 are not deliberately entered by the user. For instance, the inputs received may include secondary data that is tangentially related to the primary data deliberately entered by the user. This secondary data may aid the system 100 in adapting or "personalizing" its outputs to the user. Thus, as discussed above, the secondary data may be indicative of personal characteristics about the user (e.g., the user's age, gender, accent, personal appearance, or the like) and/or the user's affective state (e.g., whether the user appears to be in a hurry, irritated, distracted, or the like).

The interaction management module 106 is a processor that is coupled to the input device 102. The interaction management module 106 receives and processes the system inputs collected by the input device 102 in order to formulate a correct system output (e.g., a response to a user request).

The user characteristics and affective state computation module 108 is a processor that is coupled to the sensors 104. The user characteristics and affective state computation module 108 receives and processes the system inputs collected by the sensors 104 in order to produce information related to the user's characteristics and affective state. In one embodiment, the user characteristics and affective state computation module 108 is coupled to the interaction management module 106, and the information related to the user's characteristics and affective state is outputted to the interaction management module. The information related to the users characteristics and affective state allows the interaction management module 106 to further adapt the system output to the user (e.g., by "personalizing" the system output as discussed above).

The output device 110 is coupled to the interaction management module 106 and outputs the system output to the user. In one embodiment, the output device 110 comprises one or more of the following: a display, a speaker, a haptic device, or a network interface (which allows the system 100 to send outputs to a remote device).

Figure 2:
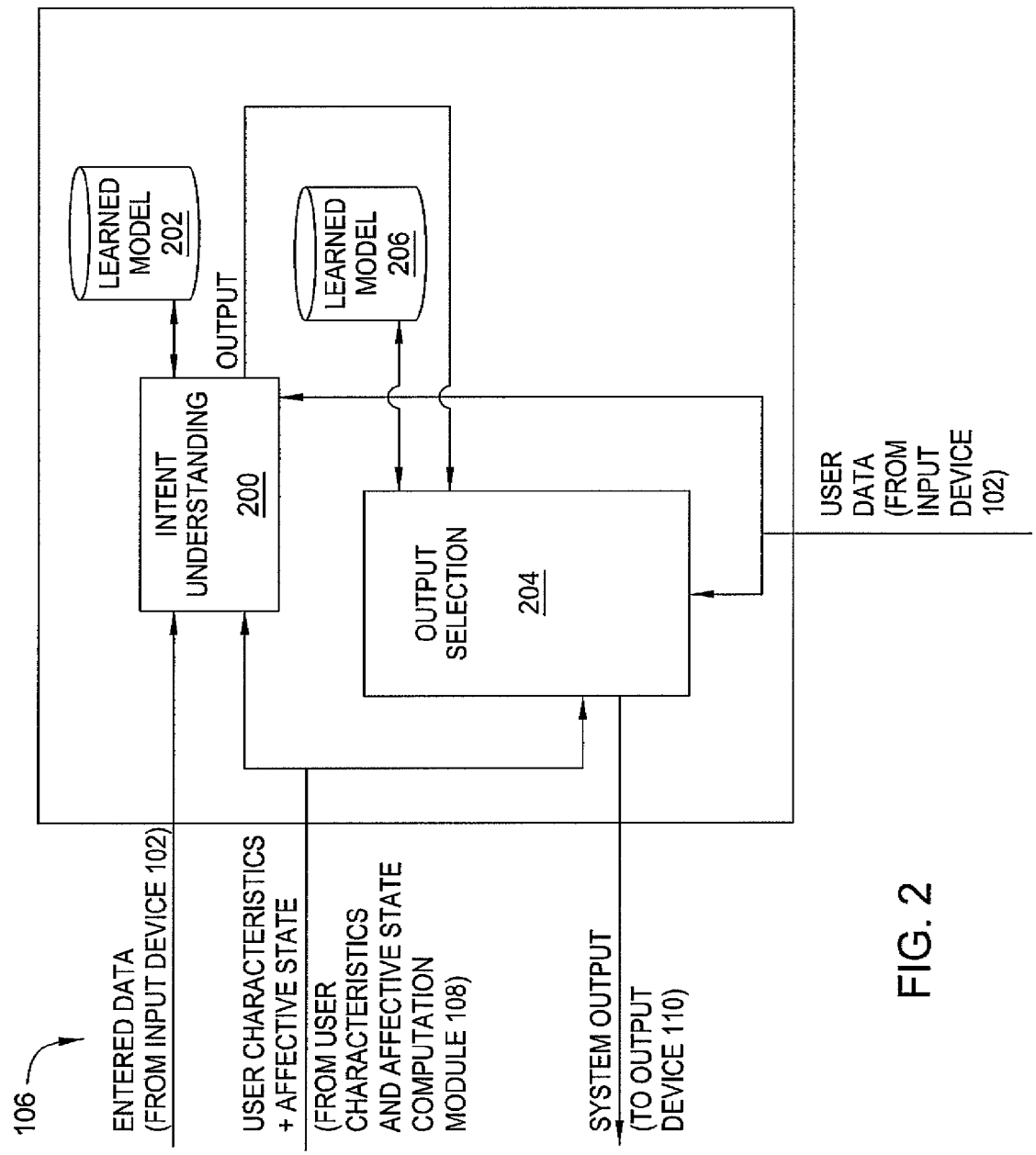
FIG. 2 is a schematic diagram illustrating one embodiment of the interaction management module of FIG. 1 in more detail.

FIG. 2 is a schematic diagram illustrating one embodiment of the interaction management module 106 of FIG. 1 in more detail. As illustrated, the interaction management module 106 generally comprises an intent understanding module 200, a first set of learned models 202, an output selection module 204, and a second set of learned models 206.

The intent understanding module 200 is a processor that parses user intent from the entered data provided by the user, the stored user data, and/or user characteristics and affective state (provided by the user characteristics and affective state computation module 108). In other words, the intent understanding module 200 determines what information the user is seeking from the system 100 (e.g., directions to a specific location, an answer to a question, etc.). In one embodiment, the intent understanding module 200 comprises at least one of the following: an automatic speech recognition (ASR) processor, an optical character recognition (OCR) processor, or a natural language understanding (NLU) engine.

In one embodiment, the intent understanding module 202 is coupled to the first set of learned models 202, which help the intent understanding module 200 to determine user intent based on learned information. In one embodiment, at least some of the models in the first set of learned models 202 are statistical models. In a further embodiment, the first set of learned models 202 includes at least one of: a Hidden Markov Model (e.g., for use in automatic speech recognition), a Gaussian mixture model (e.g., for characterizing overall classes base don cepstral features), a support vector machine (e.g., for processing high dimensionality features such as N-grams), a decision tree (e.g., for processing complex feature spaces and probability distribution combinations), or a neural network (e.g., for processing complex feature spaces and probability distribution combinations). In one embodiment, at least some of the models in the first set of learned models 202 are context sensitive.

The output selection module 204 is a processor that selects the system output based on the system inputs (e.g., the entered data, the sensed data, and the user data) and the information parsed from these inputs (e.g., user characteristics and affective state, user requests, and user preferences). In one embodiment, the output selection module 204 comprises a processor that performs reasoning over the current context as well as the system inputs. In one embodiment, this reasoning specifically represents the required context needed before selecting an output. The reasoning also represents a set of context-dependent preferences over actions. Context dependent preferences can be updated using feedback from the user and/or human advisors. The system output is provided via the output device 110, as discussed above.

In one embodiment, the output selection module 204 is coupled to the second set of learned models 206, which help the output selection module 204 to determine the appropriate output based on the system inputs and the information parsed from the system inputs. In one embodiment, at least some of the models in the second set of learned models 206 are statistical models. In a further embodiment, the second set of learned models 206 includes at least one of: a Hidden Markov Model (e.g., for use in automatic speech recognition), a Gaussian mixture model (e.g., for characterizing overall classes base don cepstral features), a support vector machine (e.g., for processing high dimensionality features such as N-grams), a decision tree (e.g., for processing complex feature spaces and probability distribution combinations), or a neural network (e.g., for processing complex feature spaces and probability distribution combinations). In one embodiment, at least some of the models in the second set of learned models 206 are context sensitive.

The output selection module 204 also determines which modality to use to provide the system output to the user. The output selection module 204 bases this determination at least in part on the user characteristics and affective state (provided by the user characteristics and affective state computation module 108) and the stored user data. That is, the user's current mood or historical preferences may guide selection of the appropriate output modality. For instance, if the user appears distracted, an audible output modality may be preferable to modality that displays the output. Alternatively, the user's profile may state that the user prefers to receive system output in textual form.

Figure 3:
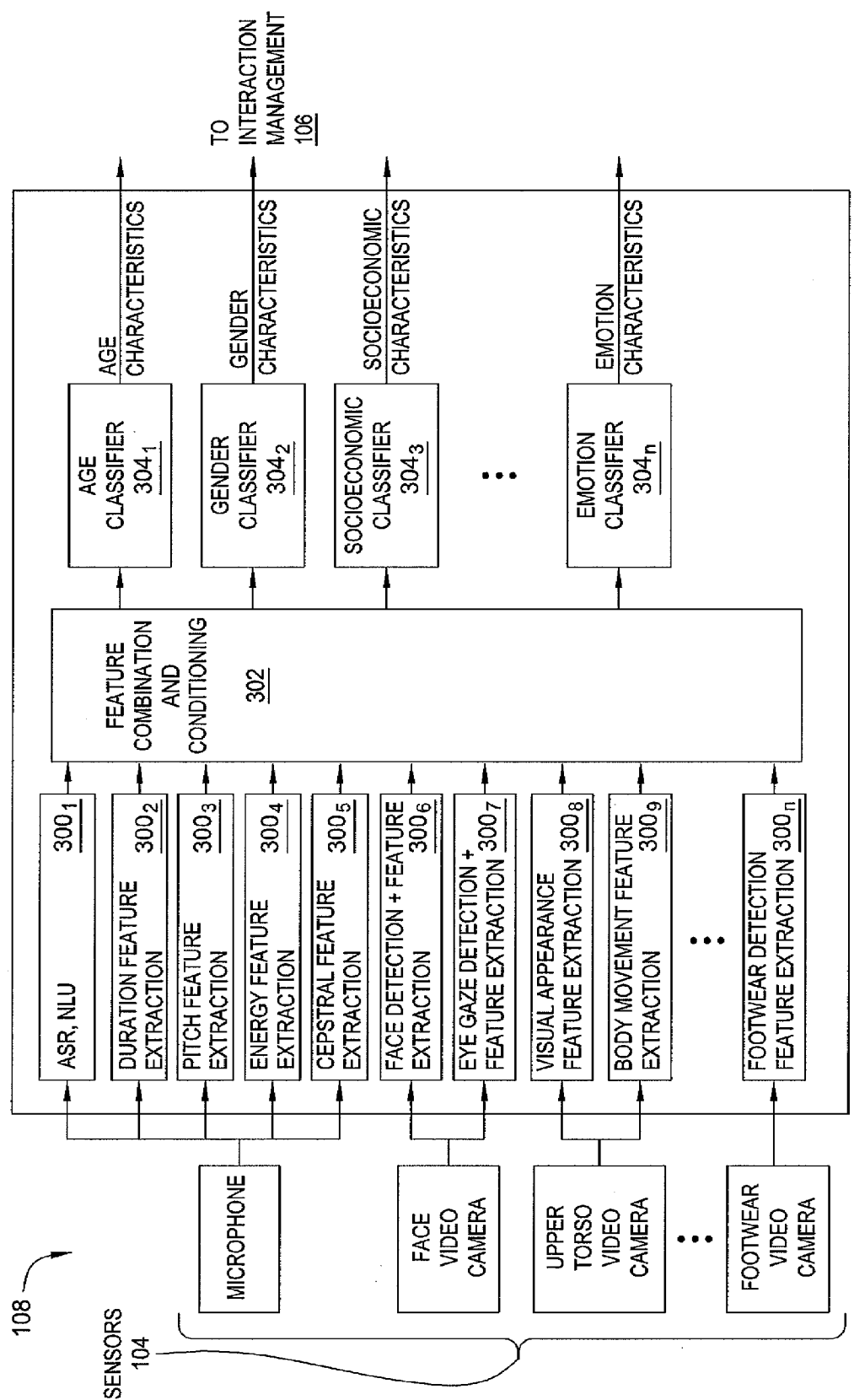
FIG. 3 is a schematic diagram illustrating one embodiment of the user characteristics and affective state computation module of FIG. 1 in more detail.

FIG. 3 is a schematic diagram illustrating one embodiment of the user characteristics and affective state computation module 108 of FIG. 1 in more detail. As illustrated, the user characteristics and affective state computation module 108 generally comprises a plurality of feature extractors $300_1$-$300_n$ (hereinafter collectively referred to as "feature extractors 300"), a feature combination and conditioning module 302, and a plurality of classifiers $304_1$-$304_n$ (hereinafter collectively referred to as "classifiers 304").

The feature extractors 300 are processors that extract features from sensed data provided as inputs by the sensors 104. FIG. 3 illustrates a plurality of exemplary sensors and corresponding feature extractors 300 to which the sensors may provide sensed data. For instance, the sensors 104 may include a microphone, a video camera focused on the user's face, a video camera focused on the user's upper torso, and a video camera focused on the user's footwear, among other sensors.

The microphone may provide sensed data to feature extractors 300 including of at least one of: an automatic speech recognition and natural language understanding processor $300_1$, a duration feature extractor $300_2$, pitch feature extractor $300_3$, an energy feature extractor $300_4$, and a cepstral feature extractor $300_5$.

Features extracted by the automatic speech recognition and natural language understanding processor $300_1$ may be specifically extracted from ASR results. These features include, but are not limited to: lexical content and linguistic content. Lexical content can be exploited using N-gram classifiers to produce a distribution of probabilities over a number of user characteristics and user states. Linguistic content can roughly indicate a user's state of mind based on, for example, words that are associated with positive or negative emotions. Linguistic measures such as "idea density" and word length across interaction sessions for a frequent user may also be extracted.

Features extracted by the duration feature extractor $300_2$ relate to the duration of events and may be specifically extracted from the time alignments of words and phones.

These features include, but are not limited to: pauses within words, increments in the duration of phones with respect to pre-computed averages, latency to produce the response to a system prompt, probability distribution of certain unit durations (e.g., phone durations), and timing information related to user interruptions to the system output.

Features extracted by the pitch feature extractor $300_3$ characterize the user's pitch excursions and may specifically be extracted from fundamental frequency (F0) or pitch contours in the user's speech and its associated ASR alignments. These features include, but are not limited to: F0 ranges within utterances and words, F0 slopes along phrases and words, probability distributions of slopes, and probability distributions of normalized F0 values (where the normalization may take the form of mean F0 removal).

Features extracted by the energy feature extractor $300_4$ include the energy-related features of speech waveforms, such as the zeroeth cepstral coefficient, the logarithm of short time energy (hereinafter referred to simply as "energy"), and time alignment information (e.g., from ASR results). These features include, but are not limited to: range of energy excursions within words and sentences, slopes of energy within words and sentences, probability distributions of normalized energy (where normalization may take the form of referring all energy values to the maximum per sentence or per interaction, among other forms of normalization), and probability distribution of energy slopes.

Features extracted by the cepstral feature extractor $300_5$ may be used to build acoustic models that are trained or adapted to speech data representative of various user characteristics and states and later used to obtain probability distributions over the various user characteristics and states.

The video camera focused on the user's face may provide sensed data to feature extractors 300 including of at least one of: a face detection and feature extractor $300_6$ and eye gaze detection and feature extractor $300_7$.

Features extracted by the face detection and feature extractor $300_6$ may be used to determine the general appearance of the user's face as well as any facial expressions made by the user. These features include, but are not limited to, the following features of the face and/or facial elements (e.g., mouth, eyebrows, eyes, head, etc.): color, shape, texture, position, orientation, movement. These features may also include: the color, shape, and texture of the user's hair (or lack thereof), head coverings worn by the user (e.g., hat, scarf, etc.), facial coverings (e.g., hijab), and facial jewelry (e.g., earrings, nose ring, etc.). In one embodiment, this information can be extracted by detecting the user's face and performing principal component analysis (PCA) on the face region. In another embodiment, the temporal components of some of these features may also prove useful.

Features extracted by the eye gaze detection and feature extractor $300_7$ can be used to determine how attentive the user is to the system 100 or the system's output. These features include, but are not limited to: whether the user is looking at the system display, what percentage of the time the user spends looking at the display, what parts of the display the user focuses on, how close the user's focus is to the desired areas of focus, and what percentage of the time the user spends looking at the desired area of focus.

The video camera focused on the user's upper torso may provide sensed data to feature extractors 300 including of at least one of: a visual appearance feature extractor $300_8$ and a body movement feature extractor $300_9$.

Features extracted by the visual appearance feature extractor $300_8$ include, but are not limited to, data about the area below the user's face (including the neck and chest area). The visual appearance of this area, including the choice of clothing, the style in which the clothing is worn, and the presence of specific jewelry (e.g., religious jewelry), is very helpful in characterizing the user. Appearance patterns in this area can be extracted by collecting shape, color, and texture features and applying statistical pattern recognition methods.

Features extracted by the body movement feature extractor $300_9$ include, but are not limited to: pose or motion of the user's head, arms, hands, legs, and feet as a function of time.

The video camera focused on the user's footwear may provide sensed data to feature extractors 300 including at least a footwear detection and feature extractor 300.

Features extracted by the footwear detection and feature extractor $300_n$ may indicate the style and condition of the user's footwear (which may be strongly associated with the user's socioeconomic group). Appearance patterns in this area can be extracted by collecting shape, color, and texture features and applying statistical pattern recognition methods.

The feature combination and conditioning module 302 is a processor that combines and conditions the features that are extracted by the feature extractors. In one embodiment, multiple features are combined at different levels and modeled as joint features, which allows the statistical models to account for dependencies and correlations. In one particular embodiment, a first group of features is conditioned on a second group of features at specific events. For example, a good prosodic feature for frustration is the pitch taken specifically from the longest (relative to its intrinsic duration) vowel region in an utterance (i.e., not the pitch everywhere, but rather the pitch when the user stretches out a word).

The classifiers 304 are processors that generate conclusions about the user based on the combined and conditioned features provided by the feature combination and conditioning module 300. FIG. 3 illustrates a plurality of classifiers 304 to which the feature combination and conditioning module 302 may provide combined and conditioned features. For instance, the classifiers 304 may include at least one of the following: an age classifier $304_1$, a gender classifier $304_2$, a socioeconomic classifier $304_3$, and an emotion classifier $304_n$. The age classifier $304_1$ makes a conclusion with respect to the age characteristics of the user, based on the sensed data. The gender classifier $304_2$ makes a conclusion with respect to the gender of the user, based on the sensed data. The socioeconomic classifier $304_3$ makes a conclusion with respect to the socioeconomic group of the user, based on the sensed data. The emotion classifier $304_n$ makes a conclusion with respect to the current emotional or affective state of the user, based on the sensed data. All of these characteristics are output by their respective classifiers 304 to the interaction management module 306, as discussed above.

Many specific types of classifiers may be implemented in the classifiers 304. For example, statistical classifiers can be implemented and trained to perform classification of user characteristics and states (e.g., by generating a probability distribution over user characteristics and states). Statistical classifiers may be useful in performing classification based on the duration events, frequency and pitch, energy, and visual characteristics. Probability distributions generated by statistical classifiers for various characteristics can be combined to obtain a final estimate of user characteristics and states. Training-based classifiers may try to match PCA and/or object or pattern recognition results to trained models that correspond to defined user characteristics and states.

To use the extracted features in a statistical classification framework, statistical models are developed and trained on the extracted features or on different subsets of the extracted features. As discussed above, the models include probability distributions over the user characteristics and states, which can be further combined to produce a final estimation of probabilities over the user characteristics and states. Model training requires a significant amount of labeled training data, obtained from a plurality of interactions between the system 100 and users. The labels are typically assigned by human experts and applied to every interaction. In one embodiment, the labels correspond to the same categories used to classify the user characteristics and states. With respect to user states, which can change with time and potentially change quite rapidly or abruptly, it is important to label the interactions at a sufficient resolution level.

The system 100, configured as illustrated in FIGS. 1-3, enhances the user experience by tailoring the output of the system 100 to the user's preferences, personality, and mood. For instance, many people have pleasant experiences interacting with someone of their own age, ethnic group, gender, or socioeconomic group (e.g., religious, corporate culture, retired, student, etc.). Interaction styles among these different groups tend to vary widely (e.g., students and business people tend to interact in different ways), and the system 100 can emulate these interaction styles based on its conclusions about the user.

Moreover, the system 100 is capable of adapting its output to more transient or dynamic user traits, such as the user's mood (e.g., "calm and attentive," "stressed," "in a hurry," "distracted or not focused," "angry," "frustrated," etc.). For instance, if the user appears to be calm and attentive, the system 100 may assume that full explanations can be given and followed. However, if the user appears to be stressed or in a hurry, the system 100 may choose to present a more concise explanation or to suppress proactive output, Alternatively, if the user appears to be frustrated the system 100 may choose to connect the user with a human advisor (e.g., explicitly or in the form of a human supervising and controlling the system 100). If the user appears distracted or not focused, the system 100 may choose to cut an explanation short and attempt to regain the user's attention with another action (e.g., asking whether the previous output was what the user wanted).

Figure 4:
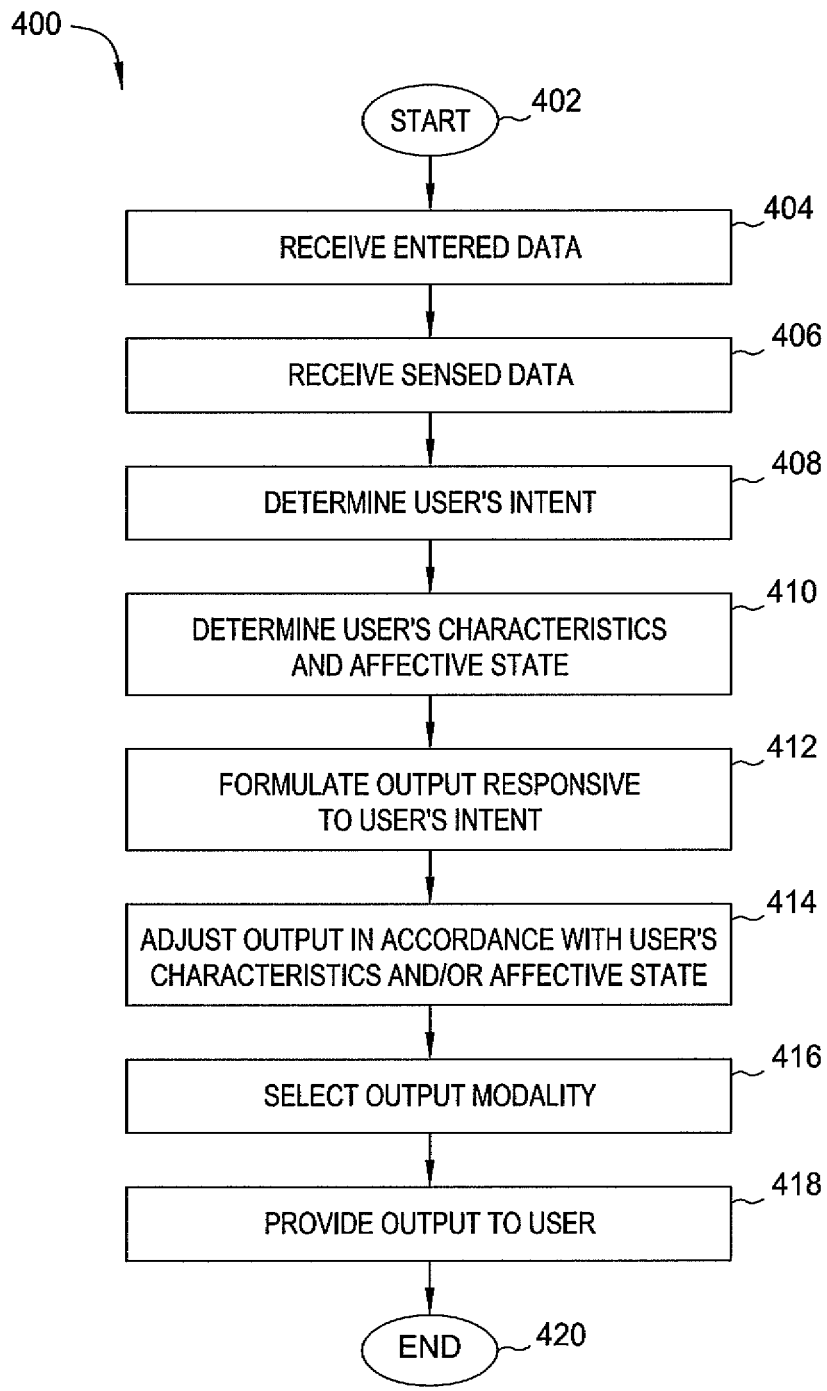
FIG. 4 is a flow diagram illustrating one embodiment of a method for responding to a user request, according to the present invention.

FIG. 4 is a flow diagram illustrating one embodiment of a method 400 for responding to a user request, according to the present invention. The method may be implemented, for example, by the intelligent assistant system 100 illustrated in FIGS. 1-3. As such, reference is made in the discussion of the method 400 to various elements of FIGS. 1-3. It will be appreciated, however, that the method 400 is not limited to implementation with the specific configuration illustrated in FIGS. 1-3, and may, in fact, be implemented with intelligent assistant systems having alternative configurations.

The method 400 is initialized at step 402 and proceeds to step 404, where the system 100 receives (via the input device 102) entered data that is entered by the user. In one embodiment, entered data comprises a user request for specific information (e.g., "Give me directions to Bart's house").

In step 406, the system 100 also receives (via the sensors 104 and the input device 102, respectively) sensed data and user data. As discussed above, the sensed data comprises multimodal data from which the user's characteristics and/or affective state can be inferred (e.g., the user's appearance or movements), while the user data comprises stored data about the user, (e.g., user preferences). In one embodiment, the sensed data is detected over a limited temporal window of user activity. Although steps 404 and 406 are depicted sequentially in FIG. 4, they may occur in parallel, or step 406 may occur before step 404.

In step 408, the intent understanding module 200 of the interaction management module 106 determines the user's intent from the entered data. For example, if the entered data was the voice command, "Give me directions to Bart's house," the intent understanding module 200 should determine that the user's intent is to acquire directions to Bart's house. As discussed above, this step may include various processing steps that operate on the entered data and may invoke various models, depending on the form in which the entered data was received (e.g., NLU, ASR, OCR, or the like).

In step 410, the user characteristics and affective state computation module determines the user's current characteristics (e.g., the user is an adult male) and affective state (e.g., the user appears to be in a hurry). As discussed above, this step may include various processing steps that operate on the sensed data, depending on the form in which the sensed data was received (e.g., feature extraction and classification). Although steps 408 and 410 are depicted sequentially in FIG. 4, they may occur in parallel, or step 410 may occur before step 408.

In step 412, the output selection module 204 of the interaction management system 106 formulates an output responsive to the user's intent (e.g., directions to Bart's house).

In step 414, the output is adjusted in accordance with the user's preferences (e.g., as embodied in the user data), characteristics, and/or affective state. In one embodiment, this adjustment is applied to one or more of the following system actions: the pattern of assistance (e.g., the steps used to guide the user toward fulfilling his intent), the modality of the system output (e.g., speech, text, graphics, etc.), or the words that make up the system output (e.g., less formal language for younger and/or informally dressed users). For instance, if the user appears to be rushed, the output may be abbreviated. Alternatively, if the output is, for example, a product or service recommendation, the system 100 may delay the timing of the output until the user's mood is more receptive to such recommendations.

In step 416, the output selection module 204 of the interaction management system 106 selects a modality for the system output (e.g., audio). In one embodiment, an appropriate output modality accounts for the user's preferences (e.g., as embodied in the user data) and/or characteristics and affective state (e.g., as inferred by the user characteristics and affective state computation module 108). For instance, an audio modality may be preferable when the user appears to be in a hurry and may not have time to read the output off of a display. Alternatively the user's preference may state that audio output is preferred over other modalities.

Once the output modality has been selected, the output device 110 provides the system output to the user in step 418, via the selected output modality.

The method 400 terminates in step 420.

As discussed above, adjustments made to the system 100 to tailor its output may be applied to all users, to a single user, or to a specific class of users. For classes of users, the adjustments may be generally relevant or relevant only to specific contexts. For example, the best system action when the user is dressed casually on a weekend may be different from the best system action when the user is formally dressed during working hours.

Figure 5:
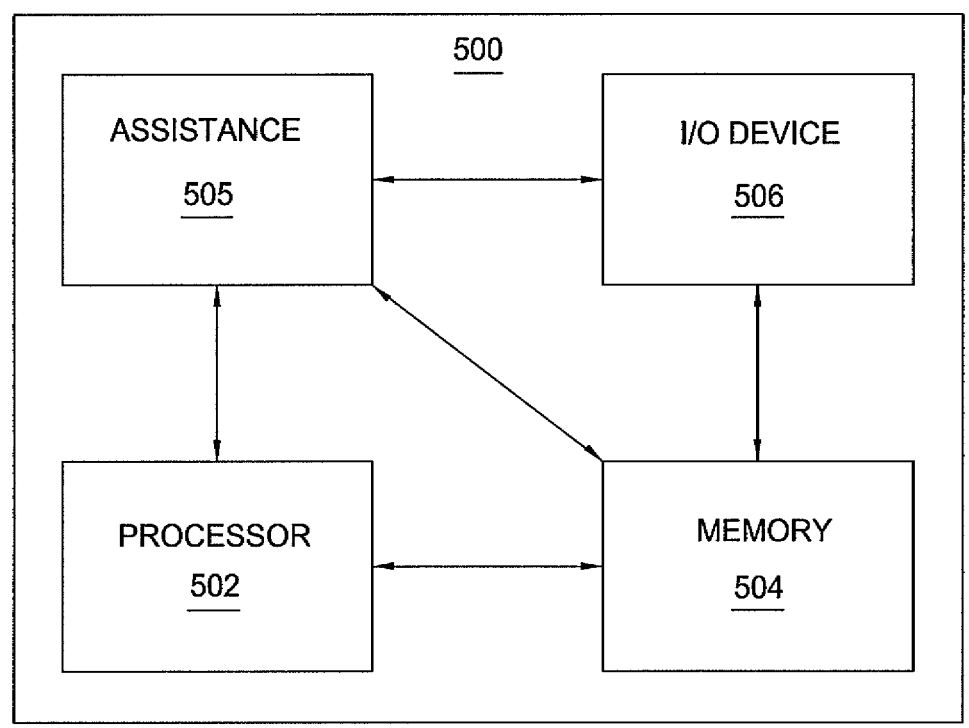
FIG. 5 is a high level block diagram of the present invention implemented using a general purpose computing device.

FIG. 5 is a high level block diagram of the present invention implemented using a general purpose computing device 500. It should be understood that embodiments of the invention can be implemented as a physical device or subsystem that is coupled to a processor through a communication channel. Moreover, as discussed above, several of the discrete components of the automated intelligent assistant system 100 can be implemented as processors. Therefore, in one embodiment, a general purpose computing device 500 comprises a processor 502, a memory 504, an assistance module 505, and various input/output (I/O) devices 506 such as a display, a keyboard, a mouse, a modem, a microphone, speakers, a touch screen, and the like. In one embodiment, at least one I/O device is a storage device (e.g., a disk drive, an optical disk drive, a floppy disk drive).

Alternatively, embodiments of the present invention (e.g., assistance module 505) can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the assistance module 505 for tailoring the output of an intelligent automated assistant to a user described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for conducting an interaction with a human user, the method comprising:
   collecting data about the user using a multimodal set of sensors positioned in a vicinity of the user;
   making a set of inferences about the user in accordance with the data; and tailoring an output to be delivered to the user in accordance with the set of inferences wherein making the set of inferences comprises extracting at least one feature from the data; and classifying the at least one feature in accordance with at least one model that defines a potential characteristic of the user.

2. The method of claim 1, wherein the set of inferences further relates to one or more personal characteristics of the user.

3. The method of claim 2, wherein the one or more personal characteristics include an age of the user.

4. The method of claim 2, wherein the one or more personal characteristics include a gender of the user.

5. The method of claim 2, wherein the one or more personal characteristics include a socioeconomic group to which the user belongs.

6. The method of claim 1, wherein the plurality of features include at least one of:
   a lexical content of an utterance made by the user or a linguistic content of an utterance made by the user.

7. The method of claim 1, wherein the plurality of features include at least one of: one or more pauses within an utterance made by the user, one or more increments in a duration of phones uttered by the user relative to a pre-computed average, a latency of the user to produce a response to a prompt, a probability distribution of unit durations, or timing information related to one or more user interruptions to a previous output.

8. The method of claim 1, wherein the plurality of features include at least one of: a fundamental frequency range within an utterance made by the user, a fundamental frequency slope along one or more words, a probability distribution of a slope, or a probability distribution of a plurality of fundamental frequency values.

9. The method of claim 1, wherein the plurality of features include at least one of: a range of energy excursions within an utterance made by the user, a slope of energy within an utterance made by the user, a probability distribution of normalized energy, or a probability distribution of energy slopes.

10. The method of claim 1, wherein the plurality of features include at least one of: a color of at least a portion of a face of the user, a shape of at least a portion of a face of the user, a texture of at least a portion of a face of the user, an orientation of at least a portion of a face of the user, or a movement of at least a portion of a face of the user.

11. The method of claim 1, wherein the plurality of features include at least one of: whether the user is looking at a display on which the output is to be presented, a percentage of time spent by the user looking at a display on which the output is to be presented, a part of a display on which the output is to be presented on which the user is focused, how close a focus of the user is to a desired part of a display on which the output is to be presented, or a percentage of time spent by the user looking at a desired part of a display on which the output is to be presented.

12. The method of claim 1, wherein the plurality of features include at least one of: a shape of an area below a face of the user, a color of an area below a face of the user, or a texture of an area below a face of the user.

13. The method of claim 1, wherein the plurality of features include at least one of: a pose of a portion of a body of the user as a function of time or a motion of a portion of a body of the user as a function of time.

14. The method of claim 1, wherein the plurality of features include at least one of: a shape of footwear worn by the user, a color of footwear worn by the user, or a texture of footwear worn by the user.

15. The method of claim 1, wherein the classifying is performed using a statistical classifier.

16. The method of claim 1, wherein the classifying is performed using a training-based classifier.

17. A non-transitory computer readable medium containing an executable program for conducting an interaction with a human user, where the program performs steps comprising:
   collecting data about the user using a multimodal set of sensors positioned in a vicinity of the user;
   making a set of inferences about the user in accordance with the data; and tailoring an output to be delivered to the user in accordance with the set of inferences wherein making the set of inferences comprises extracting at least one feature from the data; and classifying the at least one feature in accordance with at least one model that defines a potential characteristic of the user.

18. A system for conducting an interaction with a human user, the system comprising:
   a plurality of multimodal sensors positioned in a vicinity of the user for collecting data about the user;
   a plurality of classifiers for making a set of inferences about the user in accordance with the data; and
   an output selection module for tailoring an output to be delivered to the user in accordance with the set of inferences wherein making the set of inferences comprises extracting at least one feature from the data; and classifying the at least one feature in accordance with at least one model that defines a potential characteristic of the user.

* * * * *